(No Model.)
R. LUNDELL.
GOVERNING ELECTRIC MOTORS.
No. 486,214. Patented Nov. 15, 1892.
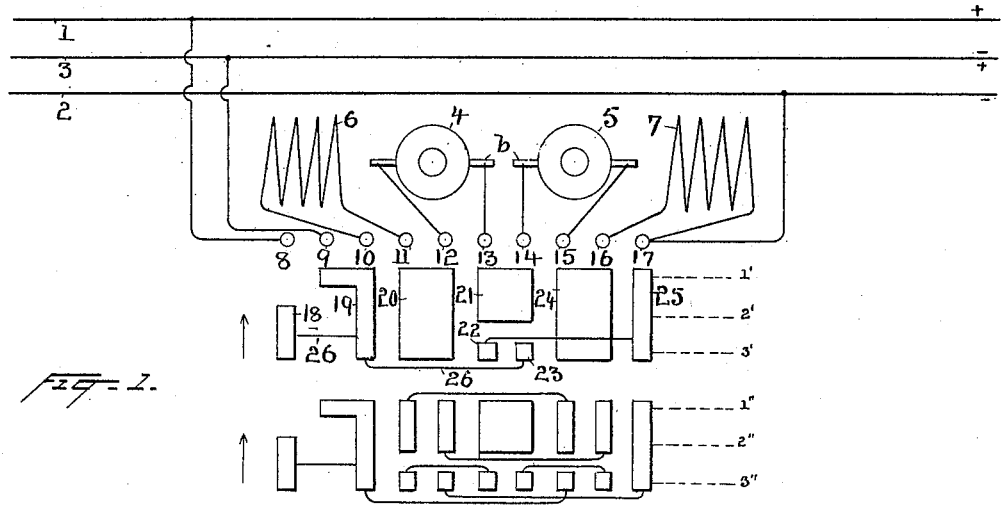
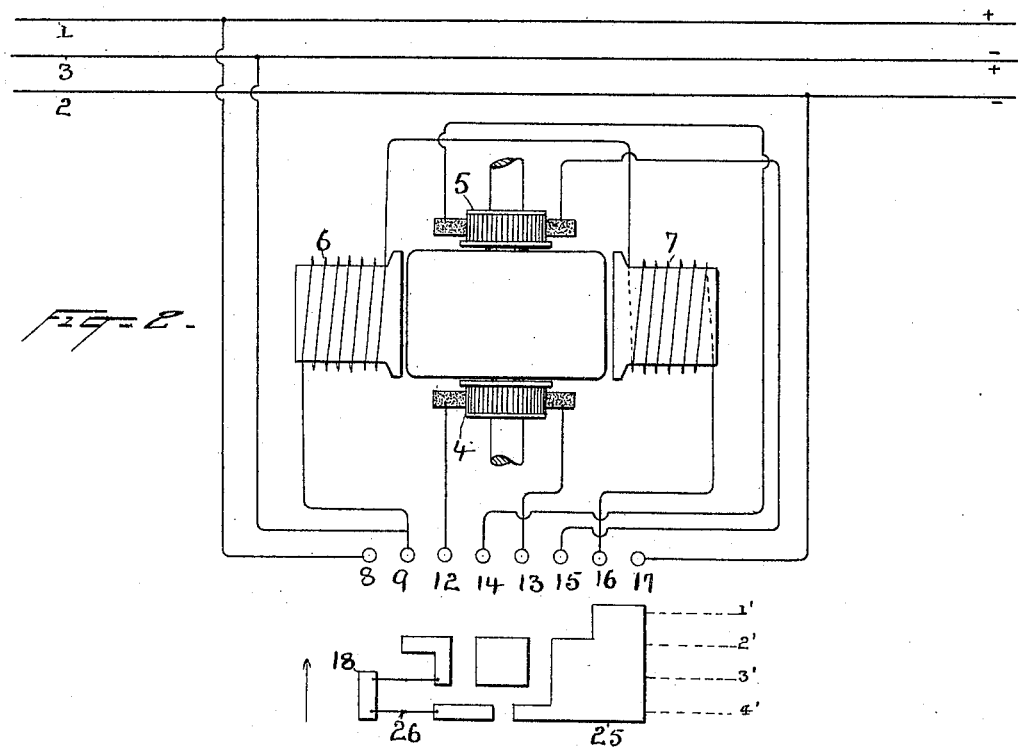
Witnesses
Norris A. Clark.
N. F. Oberts
Inventor
R. Lundell,
By his Attorneys
Dyer & Seely

UNITED STATES PATENT OFFICE.

ROBERT LUNDELL, OF NEW YORK, N. Y., ASSIGNOR OF ONE-HALF TO EDWARD H. JOHNSON, OF SAME PLACE.

GOVERNING ELECTRIC MOTORS.

SPECIFICATION forming part of Letters Patent No. 486,214, dated November 15, 1892.

Application filed January 2, 1892. Serial No. 416,782. (No model.)

*To all whom it may concern:*

Be it known that I, ROBERT LUNDELL, a citizen of the United States, residing in New York city, county and State of New York, have invented a certain new and useful Improvement in Governing Electrical Motors Connected to Three-Wire Systems, of which the following is a specification.

The present invention relates to a method of and apparatus for governing electrical motors in systems employing divided sources of current, as the three-wire systems, the main object being to furnish a simple and efficient provision for varying the speed of said motors through a wide range, and at the same time to maintain the efficiency of the motor. This invention constitutes an extension of and improvement on the method of governing motors set forth in my application, Serial No. 415,573, filed December 19, 1891.

The invention consists, mainly, in providing a motor with several field-magnet and armature coils, preferably two coils of each kind, connecting the motor to a three-wire or similar supply system, and commutating or switching the coils in such manner that the desired changes in speed shall be attained, as hereinafter explained.

In the accompanying sheet of drawings, Figure 1 is a diagram illustrating the circuit connections of a series motor and a switch for controlling the same, and Fig. 2 is a similar view in which the motor is shunt-wound.

1 2 3 are the positive, negative, and neutral conductors of a three-wire supply system, and it is supposed in the present instance that the difference in potential between the two outer wires 1 2 is two hundred and twenty volts and the difference between the central or neutral conductor and the outer conductors is one hundred and ten volts.

4 5 are commutators of two independent coils forming a part of a single armature of an electric motor, the field-magnet coils of which are indicated at 6 7. The mechanical construction of this motor is not shown in detail in this figure, since it may be the same as indicated in my application above referred to and as indicated in Fig. 2 of the present drawings. The circles 8 to 17, inclusive, represent switch-brushes or contact devices which are adapted to co-operate with the contact-plates of a switch, the shape and arrangement of the plates which may be adopted being indicated below the motor. The particular construction of switch employed is not material; but it will usually be advisable to cause the making and breaking of the circuits to be sudden, for the purpose of preventing formation of arcs, this action being well known to those familiar with switches commonly termed "snap" switches, and the row of contact devices 8 to 17 will normally stand between the two series of contact-plates on the surface of the switch, so that by moving the switch in one direction the coils will be connected up in one way, and when moved in the other direction the coils will be connected up in the opposite way to reverse the motor. The plates should, however, be so placed on the switch that the switch contact-plates will move relative to the brushes in the direction indicated by the arrows. The plates in the upper section are numbered 18 to 25 inclusive, and several of the plates are connected by wires as indicated at 26. The contact devices 8, 9, and 17 are connected, respectively, to the positive, neutral and negative supply-wires as shown. The brushes 10 11 and 16 17 are connected to the terminals of the field-magnet coils, and the brushes 12 13 14 15 are connected to the commutator-brushes $b$. When now the switch is moved to bring the contact devices onto the contact-plates in the first position of the switch, (indicated by the dotted line 1',) the circuit will be closed between the neutral conductor 3 and the negative conductor 2 through the motor-coils in series. Thus there is a potential of one hundred and ten volts on the motor. This drives the motor at approximately one-quarter its full speed and with its maximum torque. When the switch is moved so that the contact devices occupy the position indicated by line 2', the motor-coils will be in series between the positive conductor 1 and the negative 2, thus giving a potential of two hundred and twenty volts and doubling the speed, so that it will be one-half the full speed; and, finally, when the switch is moved so that the contact devices occupy the position indicated by line 3' the field-magnet coil 6 and armature-coil 4 will be in series, but will be in multiple arc with the field-magnet coil 7 and armature-coil 5, the motor being connected between the two outer conductors 1 2. This again doubles the speed, raising it to the highest speed for which it is adapted to be used without changing the torque. By tracing out the connections when the lower section of the switch is used it will be clear that the speed will be governed as above set forth, but that the circuit through the armature-coils will be in reverse direction, thereby causing the motor to turn in the opposite direction. The second speed—that is, the speed obtained with the switch-contacts on the line 2'—can be obtained as well by applying the electro-motive force between 3 and 2 to motor-coils in multiple instead of applying the electro-motive force between 1 2 to the motor-coils in series. In other words, one-half the electro-motive force of the three-wire system with motor-coils in multiple equals the full electro-motive force of the three-wire system with motor-coils in series, and to double the first speed, instead of leaving the motor-coils in series and changing the line connections, the line connections may be left the same and the motor-coils changed to multiple.

While I have shown and specifically described a three-wire system, it is evident that my invention is equally applicable to similar compensating systems having more than three wires carrying or adapted to carry different electro-motive forces.

In Fig. 2 the parts are numbered as far as possible to correspond with numbers above given. In this modification the two field-magnet coils 6 7 are always in series with each other and may be considered as forming a single coil; but by operation of the switch, the contact-plates of which are shown below the motor, the connections of these coils and of the armature-coils will be so changed that when the contacts are in the first position (indicated by the line 1') the field-magnet circuit only will be closed between conductors 3 2. In the second position of the switch the two armature-coils will be in series with each other and in multiple arc with the field-magnet coils between the same two supply-wires. In the third position the field-magnet coils will remain in the same branch between the conductors 2 3, and the armature-coils will be in series with each other in another branch between the conductors 1 2, and, finally, in the fourth position the two field-magnet coils will remain in series between the conductors 3 2, while the armature-coils will be in multiple arc with each other and will be connected between the two outer conductors 1 2, thus giving the highest speed for which the motor is adapted, at the same time maintaining its torque constant. By connecting the field-magnet coils between the wires 3 2, to constantly energize the field-magnet, I am enabled to use a coarser and shorter wire for the coils than would be possible if these shunt field-magnet coils were connected between the two outer wires 1 2, and this is advantageous.

In governing the motor, as described, no artificial resistance is employed in starting the motor or in changing its speed. The motor runs without heating at full speed any more than at slow speed, and the efficiency is practically the same at each speed.

What I claim is—

1. The combination of three or more conductors between different pairs of which different electro-motive forces are maintained, a motor having two or more armature-coils, circuit-changing devices for connecting said motor at will between different pairs of said conductors, and circuit-changing devices for altering the relation of the armature-coils, substantially as described.

2. The combination of three or more conductors between different pairs of which different electro-motive forces are maintained, a motor having two or more armature-coils and an equal number of field-magnet coils, circuit-changing devices for connecting said motor at will between different pairs of said conductors, and circuit-changing devices for altering the relation of the field-magnet and armature coils, substantially as described.

3. The combination, with the positive, negative, and neutral supply-wires, of a motor having one or more field-magnet coils and two or more armature-coils, means for closing the field-magnet circuit at will between two of said wires, and means for connecting the coils in series or in multiple arc, substantially as described.

4. The combination, with the positive, negative, and neutral supply-wires, of a motor having one or more field-magnet coils and two or more armature-coils, and means for closing the field-magnet circuit at will between the central and outer wires or between the two outer wires, and means for changing the connections of the motor-coils to series or to multiple, substantially as described.

5. The combination, with the positive, negative, and neutral supply-wires, of a motor having several field-magnet and armature coils, a switch having contacts which in one position of the switch close circuit between the neutral and an outer wire in series through all the motor-coils, contacts which in a second position of the switch close circuit between the two outer wires through all the coils in series, and contacts which in another position of the switch close circuit between the positive and negative conductors and then throw the motor-coils in multiple arc, substantially as described.

6. The combination, with the positive, negative, and neutral supply-wires, of a motor having several field-magnet and armature coils, a switch having contacts which in one position of the switch close circuit between the neutral and an outer wire in series through all the motor-coils, contacts which in a second position of the switch close circuit between the two outer wires through all the coils in series, and contacts which in another position of the switch close circuit between the positive and negative conductors and then throw the motor-coils in multple arc, and a similar set of switch-contacts for reversing and governing the motor, substantially as described.

This specification signed and witnessed this 30th day of December, 1891.

ROBERT LUNDELL.

Witnesses:
    CHARLES M. CATLIN,
    GEORGE B. BUCHANAN.